July 9, 1957 — G. A. KELLEY — 2,798,570
AIR CONDITIONING
Original Filed Feb. 12, 1949 — 2 Sheets-Sheet 1

INVENTOR.
G. A. Kelley
BY Charles L. Haughey
Attorney

July 9, 1957 G. A. KELLEY 2,798,570
AIR CONDITIONING
Original Filed Feb. 12, 1949 2 Sheets-Sheet 2

INVENTOR
G. A. Kelley
BY Charles S. Haughey
Attorney

United States Patent Office 2,798,570
Patented July 9, 1957

2,798,570

AIR CONDITIONING

Gilbert A. Kelley, Toledo, Ohio, assignor to Surface Combustion Corporation, Toledo, Ohio, a corporation of Ohio Continuation of abandoned application Serial No. 76,079, February 12, 1949. This application February 20, 1956, Serial No. 566,610

11 Claims. (Cl. 183—2)

This invention relates to a method of and apparatus for controlling the moisture content of air by means of a hygroscopic solution. Continuous conditioning of air to very low dew point ranges and to very low temperatures presents some special problems and multiplies existing problems. When mechanical refrigeration is used in the stream of air to be controlled, there is a distinct problem of condensation upon the cooling surfaces, which becomes frost or ice when used in low temperature ranges below 32 deg. F. The lower the temperature the lower the dew point, and the greater the moisture removal the more frost or ice is deposited upon the cooling surfaces and the less efficient they become, to the end that the cooling surfaces must be removed from service to remove the frost or ice so accumulated. When the required dew point of the treated air is much lower than 32 deg. F., or such as requires cooling of the treated air to substantially below 32 deg. F., this frosting problem becomes so great as to require substantial duplication of equipment for down time, and operating costs are also greatly increased. As the moisture removal load increases the heat removal load increases but the efficiency of the apparatus is reduced because of frost on the cooling surfaces.

The application of hygroscopic salt solutions to the same service presents difficult problems. Thus it is difficult to operate such a system economically without saturating the salt solution and salting out at some point in the system, and the cooling costs have been excessive. The moisture absorbing capacity of an hygroscopic solution varies inversely with the temperature and directly with the concentration of the solution, and the dew point of the air being treated varies directly with the temperature of the solution. Thus the solution in contact with the air being treated must be very cold if very dry air is desired. In some applications the solution must be 0 deg. F. or colder, the treated air being cooled to nearly 0 deg. F. while the dew point of the air is maintained materially lower, and the salt concentration must then be maintained at perhaps 30% of the solution, where for normal room temperature applications the solution might be at a 45% concentration and at 70 deg. F. temperature.

The volume of solution that is circulated through a regenerator system must be returned to the contactor part of the apparatus and be cooled to the desired operating temperatures. An object of the present invention is to reduce the cost of maintaining the desired low temperatures in the contactor part of the apparatus.

A usual regenerator may concentrate a solution a maximum of about 5% from a 30% solution to a 35% solution, or from a 45% solution to about a 50% solution. The size, primarily height, of a regenerator required to obtain greater concentration from a given feedstock would be prohibitive. Another object of the present invention is to obtain the effect of greater concentrations, to make the degree of concentration by the regenerator of solution delivered to the contactor independent of the size of the regenerator, without expanding the size of the facilities required and obtaining the benefits of reduced heating and cooling loads in the system which result therefrom.

For a consideration of what I consider to be novel and my invention, attention is directed to the following specification and the claims appended thereto.

In the accompanying drawings forming part of this specification,

Figure 3:
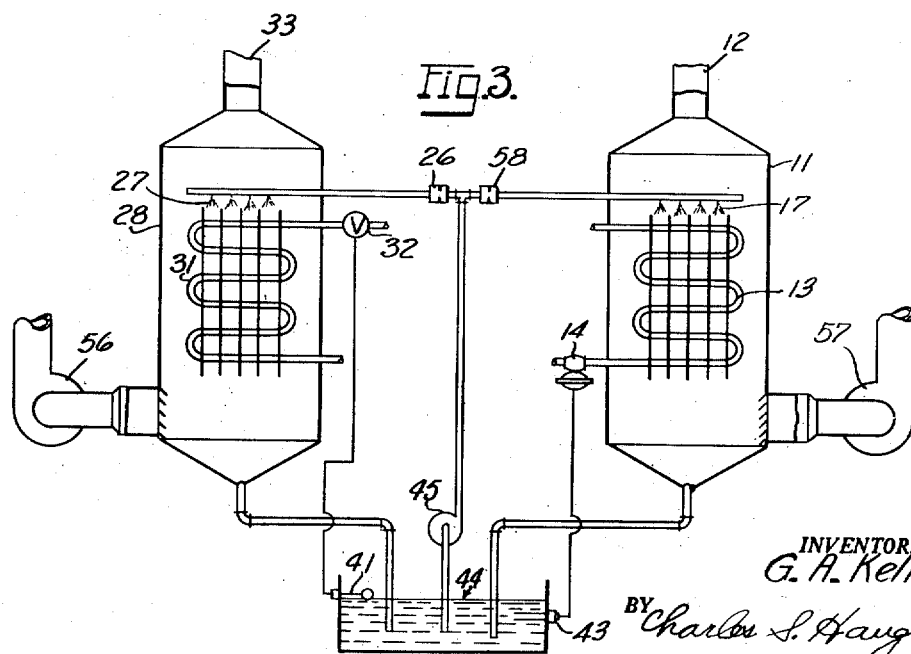

Figure 3 recalls to mind known apparatus of the subject class.

Figures 1, 4:
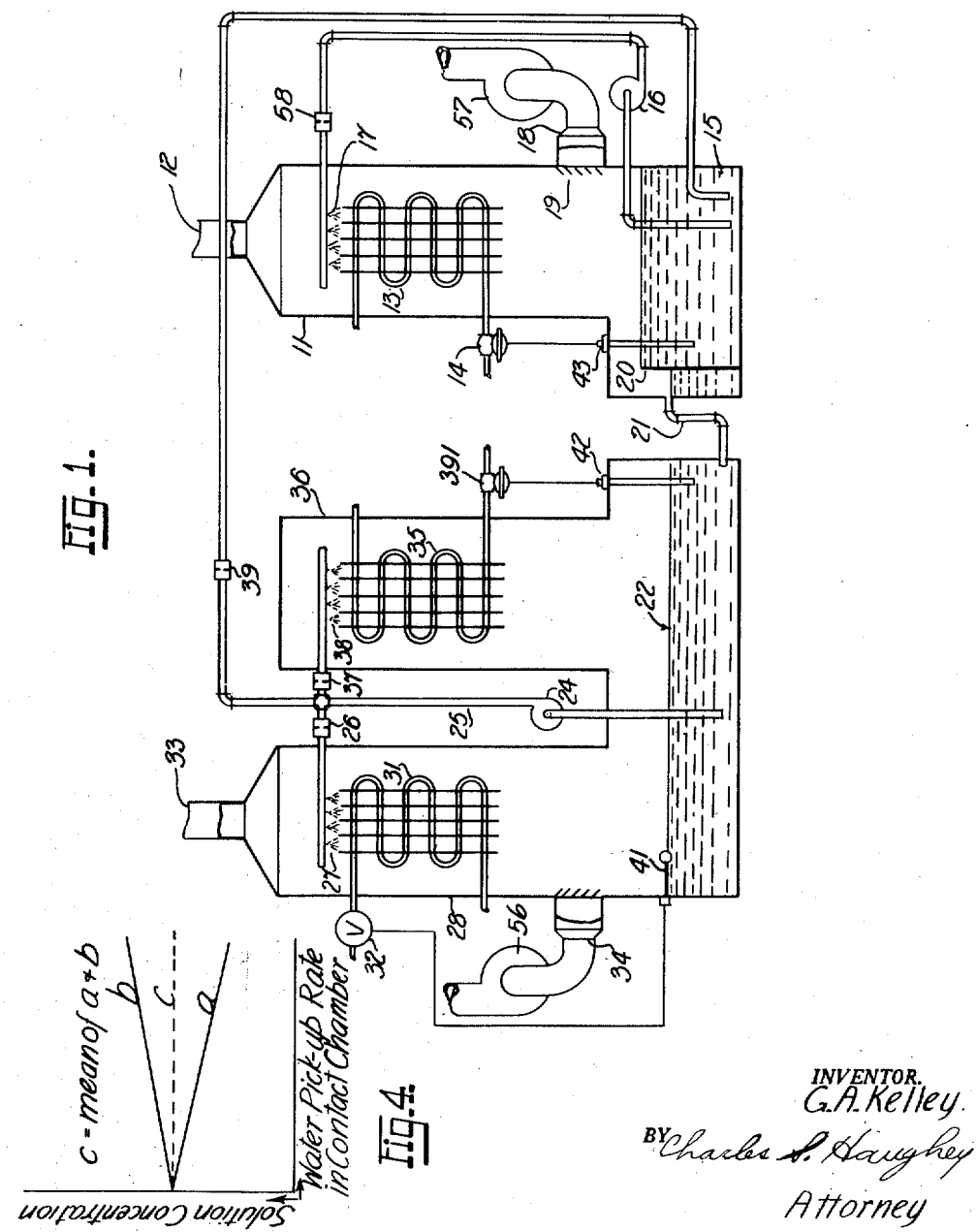
Figure 1 illustrates apparatus embodying the invention.

Figure 4 is a visual aid which is helpful in explaining certain aspects of the invention.

In accordance with the present invention as illustrated in Figure 1 the air to be dehumidified is admitted to a gas and liquid contact chamber 11 at air inlet 12 and passed over an extended surface contactor 13 which is cooled internally by a refrigerant flowing therethrough, and over which is sprayed a solution from the contact chamber, or contactor, sump 15 circulated by the pump 16 to spray nozzles 17. The refrigerant may be any conventional refrigerant which is capable of circulating at temperatures materially below 32 deg. F. Contactor 13 will generally be an expansion chamber for volatile refrigerants in a refrigation cycle, although, as is shown in Figure 1, refrigerated brine or antifreeze solutions may be circulated through the contactor 13. The dehumidified air passes out at the outlet 18 through spray eliminators 19 and is delivered by fan 57 to use. Solution from the contactor sump 15 flows by gravity over weir 20 through conduit 21 to the regenerator sump 22, and is replaced by solution from the regenerator sump. Pump 24 moves the solution from the regenerator sump 22 through conduit 25 and orifice 26 to spray nozzles 27 in a regenerator 28 and sprays it over heated contactor 31 and thence it returns to the regenerator sump 22. The regeneration is accomplished in this case by heating the regenerator contactor 31 with steam entering at inlet valve 32 and circulating ordinary outside air through the regenerator to pick up and carry away the moisture vaporized in the regenerators. The outside air enters at 33 and is exhausted at 34 by fan 56. The flow of solution passing over contactor 31 is held to a minimum to reduce the heating and cooling loads on the system and reduce pumping costs, and it is consequently impractical to cool the solution as regenerated until it has been sufficiently diluted to avoid "salting out," or saturation. Hence the hot solution is allowed to mix into the regenerator sump 22 and is cooled thereby suitable means such as the water cooled contactor 35 shown in the economizer 36. Solution is pumped from the regenerator sump 22 by pump 24 through conduit 25 and orifice 37 to nozzles 38 and passed over cooling coils of contactor 35 and returned to the regenerator sump 22 from which pump 24 also delivers the regenerated and precooled solution to the contactor sump 15 through orifices 39. Suitable controls on the solution system for concentration may be provided. The float control 41 controls steam input to the regenerator contactor 31, through valve 32, and thus the total liquid volume of the system is controlled, hence its concentration. A temperature control element 42 adjusts valve 391 to control the flow of coolant through a coil in contactor 35 and a temperature control element 43 adjusts valve 14 to control the flow of refrigerated brine through the internally cooled contactor 13.

Figure 2:
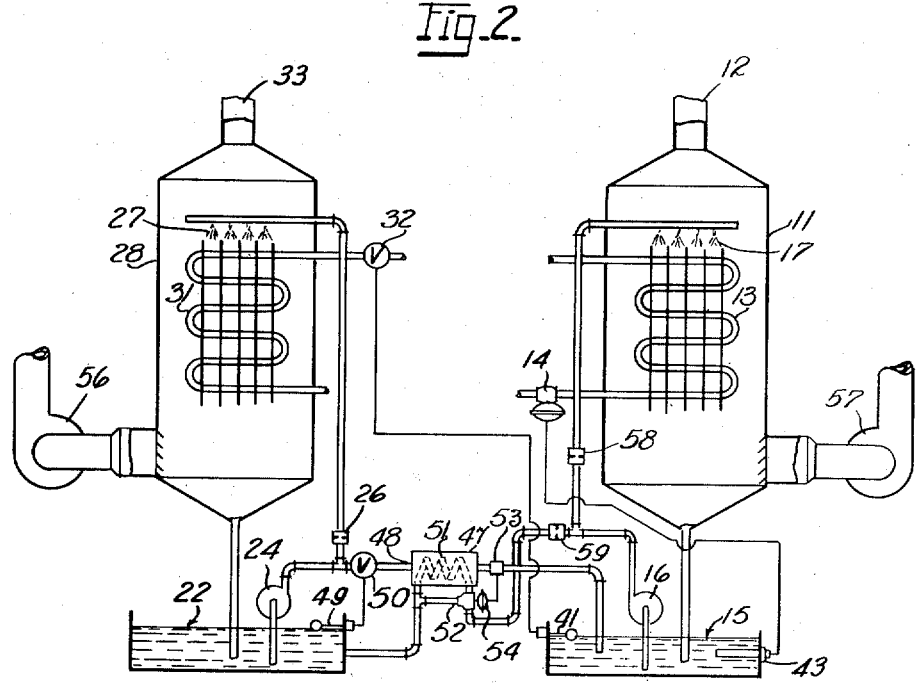
Figure 2 illustrates apparatus embodying a modification of the invention.

In Fig. 2 the cooling means for cooling solution from the regenerator sump 22 before it enters the contactor solution system comprises the heat exchanger 47 with its warm hygroscopic salt solution passage 48, the through passage 51 for cold solution from the contactor sump 15 and the by-pass passage 52 for the cold solution. The temperature of the warm solution leaving the heat exchanger 47 is controlled from element 53 by operating a valve 54 to by-pass cold solution from the contactor sump 15 around the heat exchanger 47 as required so that any desired temperature may be obtained at the warm solution outlet from the heat exchanger 47, and the solution passing through the heat exchanger 47 need never cool below its saturation temperature. In this illustration the concentration control for the solution comprises the float type volume control 41 which is in the contactor sump 15, and is connected to operate the steam flow control valve 32. Float control 49 operates valve 50 to maintain the proper flow through the warm passage 48 and hold the regenerator sump 22 level constant. In the illustration of Fig. 3 there is a single sump 44 with a single pump 45 for circulation purposes. The cooling means 13 is in the contact chamber 11, and the heating means 31 is in the regenerator 28.

The rate of water removal in the regenerator, or of water pickup in the gas and liquid contact chamber, will increase with increasing rates of solution flow very rapidly until the extended surface contactor is entirely wetted, and then the rate of water removal is only slightly increased, and ultimately decreased, by further increases in rates of solution flow over the extended surface contactor. As the pumping costs and costs of heating solution, etc. increases with increasing rates of solution flow, there will be an optimum rate of solution flow for a given size of extended surface contactor and an optimum size contactor for a given service depending upon the efficiency of the use of that contactor, etc. In commercial practice the extended surface contactor size is dictated by service requirements, and the flow of solution is preset for a given contactor.

In apparatus utilizing an hygroscopic liquid in a continuous process a common practice is to maintain substantially constant temperature and concentration of the solution in the gas and liquid contact chamber, and to adjust the regenerator to automatically remove a volume of water equal to that absorbed in the contact chamber. A modulating density control can also be used to vary solution temperature. These practices lead to some interesting relationships in concentrations under various conditions.

To more clearly illustrate the present invention, a known apparatus is illustrated in Fig. 3 to which, in Fig. 2, the present invention has been applied. For purposes of illustration the apparatus of Fig. 3 will be considered as operating with refrigerant in the contactor 13 instead of cooling water as is conventional. With a given rate of water pickup in the contact chamber and a correspondingly equal rate of water removal in the regenerator 28, if the rate of flow of the contactor return solution to the sump 44 is equal to the rate of flow of solution from the regenerator to the sump 44, then the concentration of the sump solution will be the mean concentration of the other two solutions, or an average of those two concentrations. As the rate of water pickup in the contact chamber 11 varies, the rate of water removal in the regenerator varies also, and the sump concentration will remain constant. If the rate of flow of solution from the contact chamber changes relative to the rate of flow from the regenerator, its concentration will also change, but the sump concentration will not be affected and will remain constant. Fig. 4 illustrates this relationship for Fig. 3 with the relative concentrations plotted against the rate of water pickup in the contact chamber.

Curve "a" represents the dilute solution from the contact chamber, curve "b" represents the concentrated solution returning from the regenerator, and curve "c" here represents the sump concentration which is the mean of curbes a and b.

Turning now to the system as shown in Fig. 2 and also illustrated in Fig. 1 it will be noted that the concentration relationships are not affected by the type or location of the intermediate cooling means if any are applied. The volume of solution in any cooler merely augments the total volume from which it is taken if it is recycled, or the flow volume as in transit. Ignoring then for the present consideration the volume of solution in the coolers but considering all volumes as volumes in sumps or in transit, some distinct differences are noted from the relationships shown for the apparatus of Fig. 3. To begin with, there are two sumps, or to rephrase the idea, there are two recycle systems with only pilot flow interchange of solution. If the volumes of the two sumps or recycle systems are equal, and the rate of flow to the regenerator and the contactor are equal, the concentration of the contactor sump will be less than that of the regenerator sump, and the mean concentration of the two will remain constant as the two sump concentrations change with the load of water removal from the air. These relationships may be illustrated by Fig. 4 where curve "a" would be the contactor sump concentration, curve "b" the regenerator sump concentration, and curve "c" the hypothetical mean of those two, a and b. There is, of course, no actual solution in this system corresponding to the concentration of the curve "c" as there was in the case illustrated by Fig. 3. It will be observed that a change in the rate of recirculation in either the regenerator or the contactor will not affect its own sump concentration. For example, by increasing the rate of contactor feed flow the concentration of the contactor return will approach an intermediate concentration, but the sump will be the same as the feed, so the return concentration will be increased. This will not affect the regenerator sump solution concentration, and the average concentration of the two sumps remains unchanged.

Again referring to Fig. 2, consider the effect of increasing the volume of the contactor sump in relation to the volume of the regenerator sump, as the contactor sump volume increases. Other factors being equal, at no load of water pickup at the contactor, the two sumps are of equal concentration as before, but as the load increases with a fixed ratio between the two sump volumes, such as 2 to 1, the variation from the original no load sump concentration will be in the same fixed ratio, and the smaller regenerator sump concentration will vary the most. The effective concentration will remain the same for the overall system, but if each sump is considered individually, as for example the contactor sump, the variation of its sump concentration with load will be less than that of the regenerator. Referring to Fig. 4, curves a, b, and c would all be depressed to a negative slope for the contactor solution cycle, curve "b" being the sump and feed concentration and curve "a" the return concentration, both of which would slope downward. The corresponding curves for the regenerator concentrations would all have a positive, or upward slope, and the ratio of the rate of rise of curve "c" for the regenerator to the fall of curve "c" for the contractor would be the same as the ratio of volume of the contactor sump to that of the regenerator, and in this example would be 2 to 1.

Having shown some concentration, volume and flow relationships of the illustrated apparatus, and having observed some marked differences between them, let us now consider a typical flow diagram such as Fig. 2 using the present invention in comparison to the corresponding flow diagram of Fig. 3, the nearest art. A typical application will be considered in which the rate of feed of solution to the contactor chamber is fixed at 1000 pounds per minute, the rate of water pickup is 4 lbs./min. from 2000 lbs./min. of air. The rate of feed to the regenerator is fixed at 50 lbs./min. and to maintain the constant volume equilibrium the steam flow to the regenerator is adjusted as required, evaporating 4 lbs./min. of water to the ventilating air passing through the regenerator. The substitutional or make up flow of concentrated solution from the regenerator sump of Fig. 2 will be fixed at 25 lbs./min. The temperature of the contactor sump will be maintained at 0 deg. F. and the temperature of the solution return from the regenerator will be 220 deg. F. For purposes of a heat-balance the return temperature of the regenerator is considered as fixed and its ventilating air flow varied for temperature control, but in actual practice the air flow is constant and the return solution temperature varies slightly.

With the limiting conditions as given let us now see what effects upon the heat balance may be observed when changing from Fig. 3 to Fig. 2 or Fig. 1, assuming the specific heat of the solution to be 1.0 for comparative purposes.

A heat balance around the sump of Fig. 3 as an isolated system shows heat entering by 1004 lbs./min. of solution at 0 deg. F. from the contactor and 46 lbs./min. at 220 deg. F. from the regenerator. By simple calculation, knowing the flow from the sump to be 1050 lbs./min. by a material balance, the sump temperature must be 9.63 deg. F., or about 10 deg. F. The quantity of heat added to the recirculating solution in the regenerator will equal the quantity removed from the recirculating solution in the contactor, exclusive of the air load in each case, since the same quantity of water is evaporated in the regenerator and is condensed in the contactor. Since at the temperatures being considered the heat is far less expensive than the refrigeration, it is very desirable to reduce the refrigeration load, and if necessary at the expense of the heating load. This must be done in such a way as not to saturate the salt solution at any part of the system. The quantity of heat load on the contactor refrigeration as shown above would be 9.63×1000 lbs./min. or 9,630 B. t. u./min. and the load on the regenerator exclusive of the load of evaporation, the water to be removed would be 50(220—9.63)=10,519 B. t. u./min.

Consider the heat balance around the sump of the regenerator for Fig. 2 assuming no heat transfer by intermediate cooling means such as the economizer of Fig. 1 or the heat exchanger of Fig. 2. The heat entering the sump from the regenerator will be in 46 lbs./min. at 220 deg. F., and 29 lbs./min. at 0 deg. F. of return from the contactor sump. The heat leaving in the 75 lbs./min. leaving the regenerator sump as found by a material balance, will be at sump temperature, which may be found to be 135 deg. F. The heat load on the regenerator from the recirculating solution is now reduced from 9,630 B. t. u./min. of Fig. 3 to 50×(220—135), 4,250 B. t. u./min. less than ½ the quantity for Fig. 3. The heat removal load on the contactor refrigeration system from recirculating solution is now reduced, since the 1000 lbs./min. is from the 0 deg. F. sump, to 25 lbs./min. at 135 deg. F., or 3,250 B. t. u./min. as compared to the 9,630 B. t. u./min. of Fig. 3, about ⅓ of the load from the same source in Fig. 3.

If the heat economy were to be improved further by direct heat exchange between the warmer return solution from the regenerator sump to the contactor sump and the colder solution flowing from the contactor sump to the regenerator sump, a heat exchanger with a mean temperature differential of 20 deg. F. would give a 15 deg. F. temperature in the concentrated solution returning to the contactor sump. However this would result in saturating and salting out in the heat exchanger. To avoid this trouble and yet obtain the maximum benefit of the heat interchange available a by-pass heat exchanger system may be used as illustrated in Fig. 2. The outlet temperature of the more concentrated solution returning to the contactor sump may then be controlled to any desired temperature, such as 90 deg. F., and a safety-factor over the saturation temperature of the solution at its worst condition may thus be maintained.

With the warm solution outlet from the heat exchanger 47 at 90 deg. F. and 25 lbs./min. flowing, the 29 lbs./min. of solution flowing to the regenerator sump will enter it at 58 deg. F., and the quantity of heat transferred in this heat exchanger would be 1,632 B. t. u./min. By a parallel and simultaneous calculation the new heat balance over the regenerator sump shows the sump temperature has risen to 157.5 deg. F. Now the change in heat load from the solution on the regenerator, from Fig. 3 to Fig. 2 with the by-pass controlled heat exchanger, is from the 10,519 B. t. u./min. of Fig. 3 to 50×(220—157.5) or 3,125 B. t. u./min., about ⅓ the former load. Correspondingly for the refrigeration system the heat load from the solution is reduced from the 9,630 B. t. u./min. for Fig. 3 to 2,250 B. t. u./min. in the feed to the contactor sump or only .235 times the former load, a ratio of 4 to 17 or 1 to 4.25.

Where the conditions of operation and reliability of controls suggest using a different type of cooler, such as that shown in the illustration of Fig. 1, or by a water cooled coil in the regenerator sump, the cooler may be controlled to hold a 90 deg. F. sump so that the refrigerator load as just discussed is unchanged at a 1 to 4.25 reduction over Fig. 3, but the heat exchanger using 60 deg. F. water and a mean temperature differential of 16 deg. F., would require 20 gallons per minute flow of the 60 deg. F. water, and the heat balance around the regenerator sump would show that with the sump controlled at 90 deg. F. the return from the cooler would be 84.3 deg. F. with a 600 lbs./min. flow through the economizer cooler, and the heat removed by the cooler would be 3,420 B. t. u./min. making a heating load on the regenerator of 6,500 B. t. u./min. as compared with the 10,519 B. t. u./min. load of Fig. 3. This does not change the figure of the cooling load on the contactor since the 90 deg. F. sump is the same temperature as the controlled bypass heat exchanger outlet, and the refrigeration is still ⅔ that of the system shown in Fig. 3, apparatus common in the art at the present time. If in Fig. 3 a water cooler were placed on the return from the regenerator, and controlled to 90 deg. F., the sump temperature would fall to 3.94 deg. F., but the heat load above 0 deg. F. carried to the refrigeration system in the contactor would be 3.94×1000, or 3,940 B. t. u./min. as compared to 2,250 B. t. u./min. heat load as shown for the system of Figs. 1 and 2. This, however, is generally avoided due to salting-out and other problems encountered.

These mathematical comparisons of the new invention applied to the same service as known equipment show the relative economy of the refrigeration supplied in the present invention by comparison. The flexibility and ease of control of this system make it especially adaptable to special conditions of physical size limitation on the regenerator and to concentration problems where salting-out of the solute is disastrous to the operation of the unit. In most actual installations the benefits derived are considerably greater than the example shown, since the pilot interchange flow greatly reduced below the example shown.

Although advantages of prime importance have this far been shown, the key to the difference between the two systems may not yet be apparent. In the design of apparatus for low temperature applications it is very desirable to reduce the refrigeration costs to a minimum, if necessary at the expense of heating or water cooling loads or efficiency. Since the practical limitations upon available equipment will limit the ratio of solution flows through the regenerator and the contactor, for example a ratio of 1 to 20 might be the lowest feasible regenerator flow rate to satisfactorily operate the regenerator, and the heat load on its corresponding contactor will be in direct relation to the volume and temperature of make up solution returned to its solution system, advantage is taken of the fact that an economical balance of low temperature and highest concentration not saturated at that temperature may be obtained with smaller volume feeds to the contactor than the 1/20 ratio illustrated, to reduce the heat load entering the contactor system by make up solution. This is done with an existing element of equipment by establishing a recycling of solution through the regenerator and removing from the regenerator system a smaller stream of solution than is being passed through its contactor. The ratio of the change in concentration from the return from the regenerator (to its sump) to the feed to the regenerator, to the change in concentration from stream flowing from the regenerator recycle system to the contactor recycle system to the stream of solution flowing from the contactor recycle system to the regenerator system is the same as the ratio of the rate of flow of solution from the contactor recycle system to the rate of flow from the regenerator contact chamber (to its sump), and that ratio is a direct indication of the reduction of heat load on the contactor refrigeration system as well as showing the proportionate concentration changes. The two sump circulation system disclosed effects great economies for and makes practical the use of continuous circulation of a hygroscopic "anti-freeze" solution over the refrigerated contactor, thus obtaining in a continuous process dehumidified air below 32° F. without the usually attendant problems of frosting of the cooling coils.

This application is a continuation of application Serial No. 76,079, now abandoned.

I claim:

1. In apparatus utilizing a hygroscopic solution to control the humidity of a gas, in combination, a solution circulation system comprising a first sump, a gas and liquid contact chamber, means for delivering solution from the first sump to the contact chamber and back to the first sump, a second sump, a regenerator, a cooler, means for circulating solution from the second sump through the regenerator and back to the second sump and through the cooler and back to the second sump, and means for circulating solution from the first sump to the second sump and from the second sump to the first sump.

2. In apparatus utilizing a hygroscopic solution to control the humidity of a gas and comprising a first sump for a first body of solution, a second sump for a second body of solution, a gas and liquid contact chamber, means for circulating a stream of solution from said first body through said chamber in a manner to absorb moisture from the gas in the chamber, a regenerator, means for circulating a stream of solution from said second body through said regenerator in a manner to remove water from said stream, and means for circulating a stream of solution from said first body to said second body and from said second body to said first body, the improvement which comprises control means in one of said sumps responsive to solution level therein for controlling the operation of said regenerator to maintain said level constant, and an overflow weir in the other of said sumps for draining excess solution therefrom to the sump containing said control means.

3. In apparatus utilizing a hygroscopic solution to control the humidity of a gas, in combination, a solution circulating system comprising a first sump, a gas and liquid contact chamber, means for delivering a stream of solution from the first sump to the said chamber and back to the first sump, a second sump, a regenerator, means for circulating a stream of solution from the second sump through the regenerator and back to the second sump, means for cooling the solution in the second sump, means for circulating a stream of solution from the first sump to the second sump, and means for circulating a stream of solution from the second sump to the first sump.

4. In apparatus utilizing a hygroscopic solution to control the humidity of a gas, in combination, a solution circulation system comprising a first sump, a gas and liquid contact chamber, means for delivering a stream of solution from the first sump to the said chamber and back to the first sump, a second sump, a regenerator, means for circulating a stream of solution from the second sump through the regenerator and back to the second sump, means responsive to the total volume of hygroscopic solution in said solution circulation system for controlling said regenerator in a manner to remove sufficient water from said solution to maintain said total volume substantially constant whereby the concentration of the solution circulated through said gas and liquid contact chamber is maintained substantially constant and the resulting dew point of the gas leaving said chamber is maintained substantially constant, means for circulating a stream of solution from the first sump to the second sump, and means for circulating a stream of solution from the second sump to the first sump.

5. In apparatus utilizing a hygroscopic solution to control the humidity of a gas, in combination, means forming an internally cooled gas and liquid contactor, a first sump, means for circulating a stream of solution from the first sump over said contactor and back to the first sump, a regenerator, a second sump, means for circulating a stream of solution from the second sump through the regenerator and back to the second sump, means for transferring a stream of solution from the first sump to the second sump, means for returning a complementary stream of solution from the second sump to the first sump, means for cooling said internally cooled contactor, and control means responsive to the temperature of the solution in said sump for controlling said cooling means to maintain the temperature of the solution in said first sump substantially constant, thereby maintaining the temperature of the gas passing through said first chamber substantially constant.

6. In apparatus utilizing a water solution of hygroscopic material to control the humidity of a gas and comprising a first sump, a second sump, a gas and liquid contact chamber, means for circulating a stream of solution from the first sump through said chamber and back to the first sump to remove water from said gas, a regenerator, means for circulating a stream of solution from the second sump to the regenerator and back to the second sump to remove water from the solution, the improvement which comprises control means for circulating a stream of solution from the second sump to the first sump at a fixed rate and for returning a stream of solution from the first sump to the second sump at a rate greater than said fixed rate by the rate at which water is removed from the gas in said chamber whereby to maintain constant and equal flow of hygroscopic material from the first sump to the second sump and from the second sump to the first sump.

7. Apparatus utilizing a water solution of hygroscopic material to dehumidify a gas comprising, in combination, a first sump for a first body of solution, a second sump for a second body of solution, means for concentrating the solution in the second sump comprising a regenerator, means for circulating a stream of solution from the second sump to the regenerator and back to the second sump, a chamber through which a current of gas to be dehumidified may be caused to flow, means for circulating a stream of solution from the first sump through said chamber to absorb moisture from the gas flowing through the chamber and returning the solution to the first sump, means for transferring from the first sump to the second sump in a first conduit a quantity of solution in excess of the amount of water absorbed by the circulating stream of solution in said chamber, means for transferring from the second sump to the first sump in a second conduit a quantity of solution which is less than the amount transferred from the first sump to the second sump by the amount of water absorbed in said chamber by the solution whereby to return to the first sump in solution the amount of hygroscopic material which was transferred from the first sump to the second sump, a heat exchanger having a first passage therethrough forming a part of the first conduit and a second passage therethrough forming part of the second conduit, said first conduit comprising means forming a by-pass conduit around the heat exchanger, and means for proportioning solution flow between the by-pass conduit and the first passage.

8. In apparatus utilizing a hygroscopic solution to control the humidity of a gas and comprising a first sump for a first body of solution, a second sump for a second body of solution, a gas and liquid contact chamber, means for circulating a stream of solution from said first body through said chamber in a manner to absorb moisture from the gas in the chamber, a regenerator, means for circulating a stream of solution from said second body through said regenerator in a manner to remove water from said stream, and means for circulating a stream of solution from said first body to said second body and from said second body to said first body, the improvement which comprises control means in one of said sumps responsive to solution level therein for controlling the operation of said regenerator to maintain said level constant, and control means in the other of said sumps operative when the solution therein exceeds a predetermined level for delivering excess solution therefrom to the sump containing said first control means.

9. In a method for controlling the humidity of a gas by contacting such gas with a refrigerated hygroscopic solution and heating hygroscopic solution to remove moisture therefrom, the steps of maintaining two separated bodies of hygroscopic solution and two independent recirculating systems, recirculating solution in one such independent system from the first body over a refrigerated surface, recirculating solution in the other such system from the second body over a heated surface, the refrigerated surface and the heated surface being remote from the bodies, transferring concentrated solution from the second independent body to the first body at a fixed rate, and transferring dilute solution from the first independent body to the second body at a rate greater than said fixed rate by the rate at which moisture is absorbed from the gas.

10. In a method for controlling the humidity of a gas by contacting such gas with a refrigerated hygroscopic solution to remove moisture from the gas and heating hygroscopic solution to remove moisture therefrom, the steps of maintaining two separated bodies of hygroscopic solution and two independent recirculating systems, recirculating solution in one such independent system from the first body over a refrigerated surface, recirculating solution in the other such system from the second body over a heated surface, the refrigerated surface and the heated surface being remote from the bodies, transferring concentrated solution from the second independent body to the first body, transferring dilute solution from the first independent body to the second body, maintaining the rate of transferring one of said solutions substantially constant, maintaining the rate of transferring the other of said solutions at a rate which is greater or less than the rate of transferring the first mentioned solution by the rate at which moisture is absorbed from the gas and controlling the temperature of the heated surface to effect removal of moisture from solution circulated thereover at a rate substantially equal to the rate at which moisture is absorbed from the gas.

11. In apparatus utilizing a water solution of hygroscopic material to control the humidity of a gas and comprising a first sump, a second sump, a gas and liquid contact chamber, means for circulating a stream of solution from the first sump through said chamber and back to the first sump to remove water from said gas, a regenerator having a heated surface, means for circulating a stream of solution from the second sump to the regenerator and back to the second sump to remove water from the solution, means for circulating a stream of solution from the second sump to the first sump and for returning a stream of solution from the first sump to the second sump, control means for maintaining substantially constant the rate of transferring one of said solutions, and means for controlling the temperature of the heated surface to effect removal of moisture from solution circulated thereover at a rate substantially equal to the rate at which moisture is absorbed from the gas, whereby to maintain constant and equal flow of hygroscopic material from the first sump to the second sump and from the second sump to the first sump.

References Cited in the file of this patent
UNITED STATES PATENTS

| | | |
|---|---|---|
| 2,192,126 | Downs | Feb. 27, 1940 |
| 2,420,993 | Kelley | May 20, 1947 |

UNITED STATES PATENT OFFICE

CERTIFICATE OF CORRECTION

Patent No. 2,798,570 July 9, 1957

Gilbert A. Kelley

It is hereby certified that error appears in the printed specification of the above numbered patent requiring correction and that the said Letters Patent should read as corrected below.

Column 8, line 36, for "said sump" read -- said first sump --.

Signed and sealed this 27th day of August 1957.

(SEAL)
Attest:

KARL H. AXLINE
Attesting Officer

ROBERT C. WATSON
Commissioner of Patents